(12) United States Patent
Wan

(10) Patent No.: US 10,483,796 B2
(45) Date of Patent: Nov. 19, 2019

(54) POWER CONTROL SYSTEM

(71) Applicant: VISION AUTOMOBILE ELECTRONICS INDUSTRIAL CO., LTD., Tainan (TW)

(72) Inventor: Tien-Bou Wan, Tainan (TW)

(73) Assignee: Vision Automobile Electronics Industrial Co., Ltd., Tainan (TW)

( * ) Notice: Subject to any disclaimer, the term of this patent is extended or adjusted under 35 U.S.C. 154(b) by 135 days.

(21) Appl. No.: 15/918,020

(22) Filed: Mar. 12, 2018

(65) Prior Publication Data

US 2019/0280524 A1 Sep. 12, 2019

(51) Int. Cl.
*H02J 50/00* (2016.01)
*H01R 24/68* (2011.01)
*H01R 13/70* (2006.01)
*H01R 13/66* (2006.01)
*H02J 7/00* (2006.01)
*H01R 103/00* (2006.01)

(52) U.S. Cl.
CPC .......... *H02J 50/00* (2016.02); *H01R 13/6675* (2013.01); *H01R 13/6691* (2013.01); *H01R 13/70* (2013.01); *H01R 24/68* (2013.01); *H02J 7/0068* (2013.01); *H01R 2103/00* (2013.01)

(58) Field of Classification Search
CPC .... H02J 50/00; H02J 7/0068; H01R 13/6675; H01R 13/6691; H01R 24/68; H01R 13/70
See application file for complete search history.

(56) References Cited

U.S. PATENT DOCUMENTS

| | | | | |
|---|---|---|---|---|
| 2004/0084972 A1* | 5/2004 | Weng | ................... | H02J 13/0075 307/140 |
| 2008/0258563 A1* | 10/2008 | Hodges | .............. | H01R 13/7038 307/112 |
| 2011/0090042 A1* | 4/2011 | Leonard | ................. | G05B 15/02 340/5.1 |
| 2012/0001488 A1* | 1/2012 | Puschnigg | ........... | H01R 13/665 307/40 |
| 2012/0293153 A1* | 11/2012 | Garb | ........................ | H02J 3/00 323/311 |
| 2015/0373796 A1* | 12/2015 | Bahrehmand | ...... | H05B 33/0815 315/129 |

\* cited by examiner

*Primary Examiner* — Jared Fureman
*Assistant Examiner* — Duc M Pham
(74) *Attorney, Agent, or Firm* — Rosenberg, Klein & Lee

(57) ABSTRACT

A power control system includes a socket module inserted into a wall socket, and a remote control module electrically connected to a switchable socket. The socket module provides mains electricity from the wall socket to an electric device connected thereto upon receiving a power-on signal, and does not provide mains electricity upon receiving a power-off signal. The remote control module is charged by mains electricity from the switchable socket that is in a conductive state, and operates with electricity stored therein to wirelessly transmit the power-on signal when the switchable socket is switched to the conductive state and to wirelessly transmit the power-off signal when the switchable socket is switched to a non-conductive state.

5 Claims, 3 Drawing Sheets

POWER CONTROL SYSTEM

FIELD

The disclosure relates to a control system, more particularly to a power control system.

BACKGROUND

Conventional household power planning typically involves arranging one or more wall sockets on one or more walls in a room, a switch on a wall close to a door of the room, and a switchable socket electrically connected to the switch. The wall sockets constantly provide mains electricity. The switchable socket is usually inserted with an electric device, such as a lighting fixture. The switch is operable to switch the switchable socket between a conductive state to output mains electricity and a non-conductive state to not output mains electricity, so that it is convenient to turn on or turn off the electric device (e.g., a lighting fixture) by operating the switch at the door of the room.

Rearrangement of the electric device in the room is limited to the position of the switchable socket since the switchable socket is fixed at a specific position on the wall. Though an extension cord can be employed to electrically connect the electric device to the switchable socket, the extension cord may result in a relatively messy appearance.

SUMMARY

Therefore, an object of the present disclosure is to provide a power control system that does not destroy tidiness of a space when in use.

According to one aspect of the present disclosure, a power control system is provided. The power control system is configured to be inserted into a switchable socket unit and a wall socket. The wall socket constantly provides mains electricity. The switchable socket is electrically connected to a switch that is operable to switch the switchable socket between a conductive state to output mains electricity and a non-conductive state to not output mains electricity.

The power control system includes a socket module and a remote control module. The socket module is configured to be inserted into the wall socket to receive mains electricity, allows an electric device to be electrically connected thereto, and is configured to provide mains electricity from the wall socket to the electric device upon wirelessly receiving a power-on signal and to not provide electricity to the electric device upon wirelessly receiving a power-off signal. The remote control module includes an electricity storage circuit that is configured to be electrically connected to the switchable socket, and that is configured to be charged by mains electricity outputted by the switchable socket when the switchable socket is in the conductive state. The remote control module is configured to operate with electricity stored in the electricity storage circuit for wirelessly transmitting the power-on signal to the socket module when the wall outlet is switched from the non-conductive state to the conductive state, and for wirelessly transmitting the power-off signal to the socket module when the wall outlet is switched from the conductive state to the non-conductive state.

BRIEF DESCRIPTION OF THE DRAWINGS

Other features and advantages of the present disclosure will become apparent in the following detailed description of the embodiment with reference to the accompanying drawings, of which.

DETAILED DESCRIPTION

Figure 1:
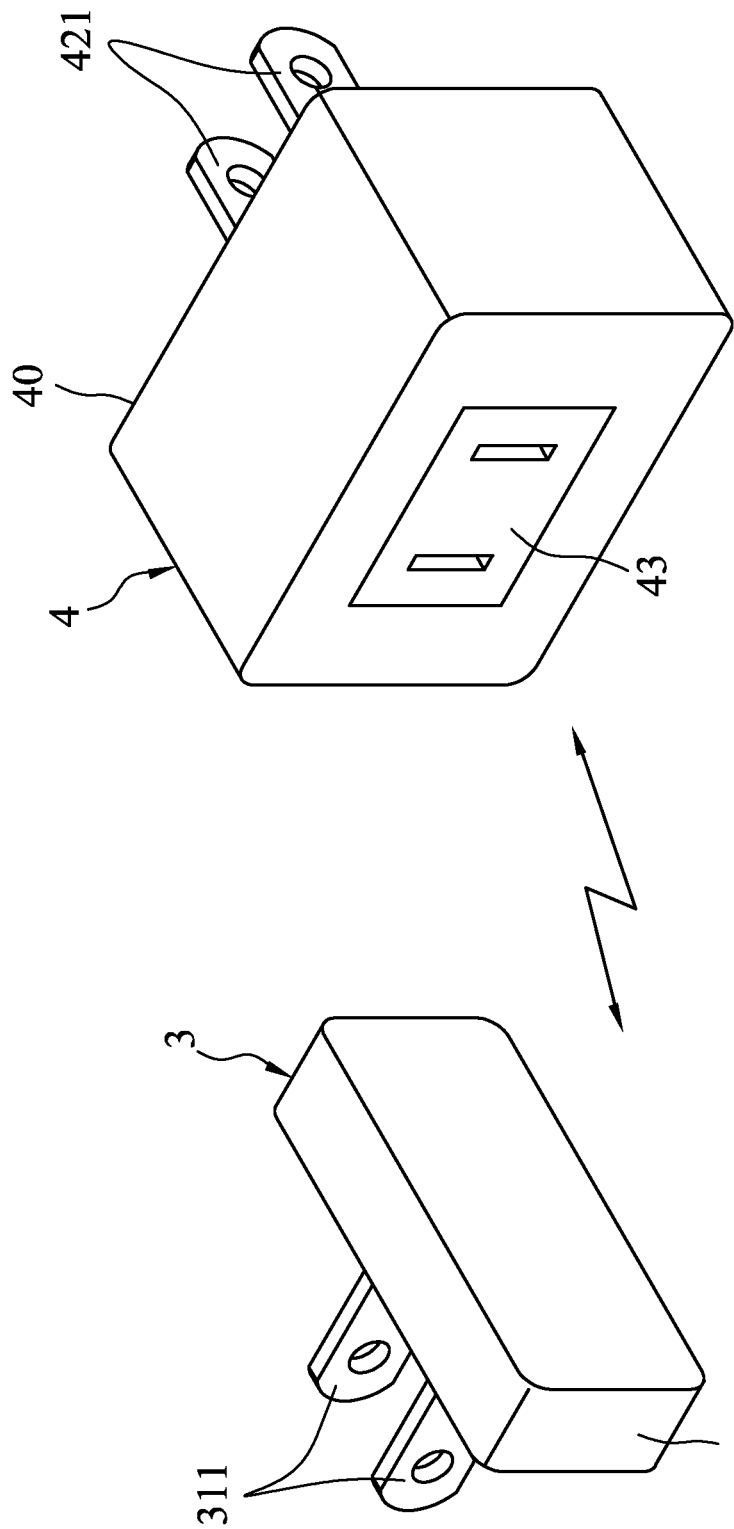
FIG. 1 is a schematic perspective view of a power control system according to one embodiment of the present disclosure.
Figure 2:
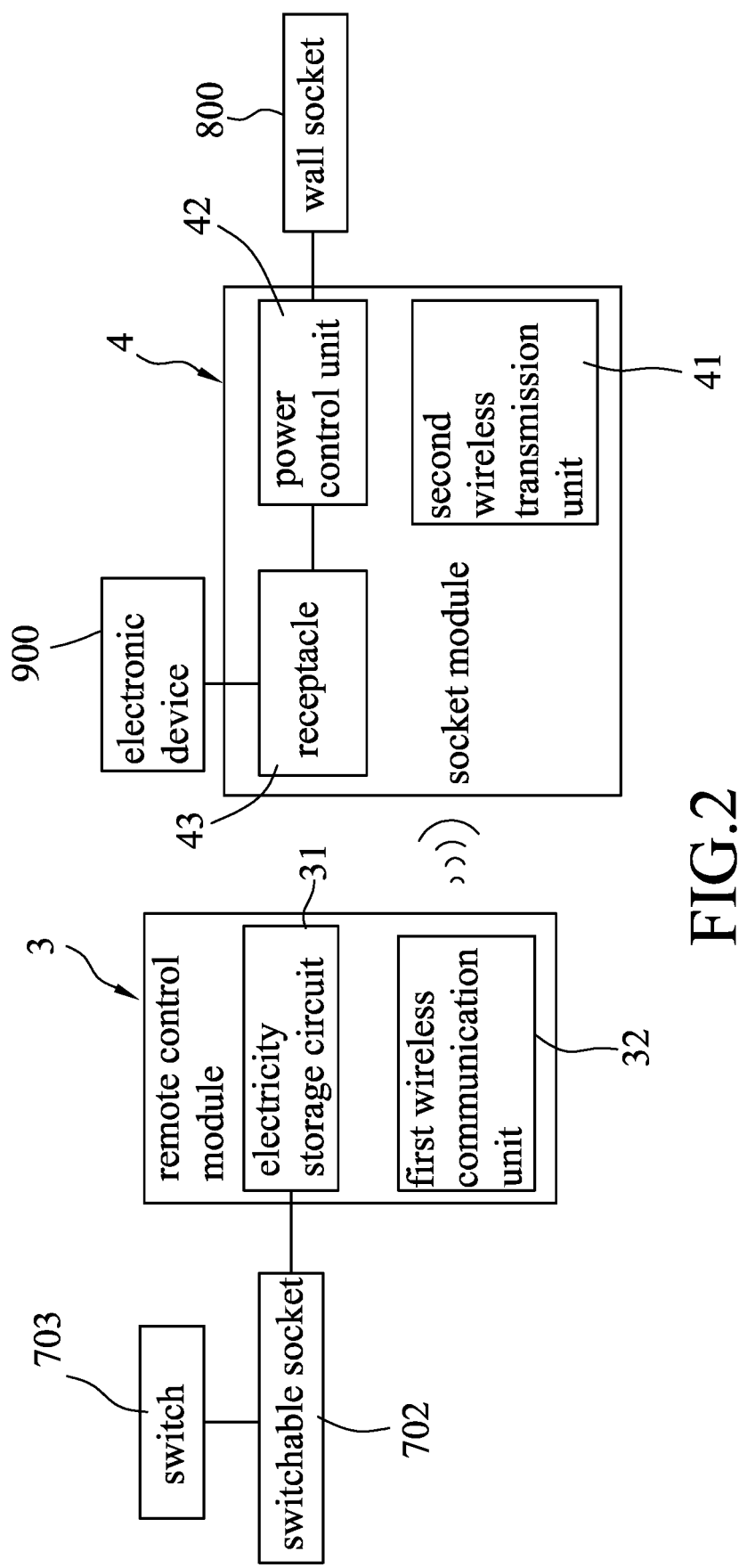
FIG. 2 is a schematic block diagram of the power control system according to one embodiment of the present disclosure.
Figure 3:
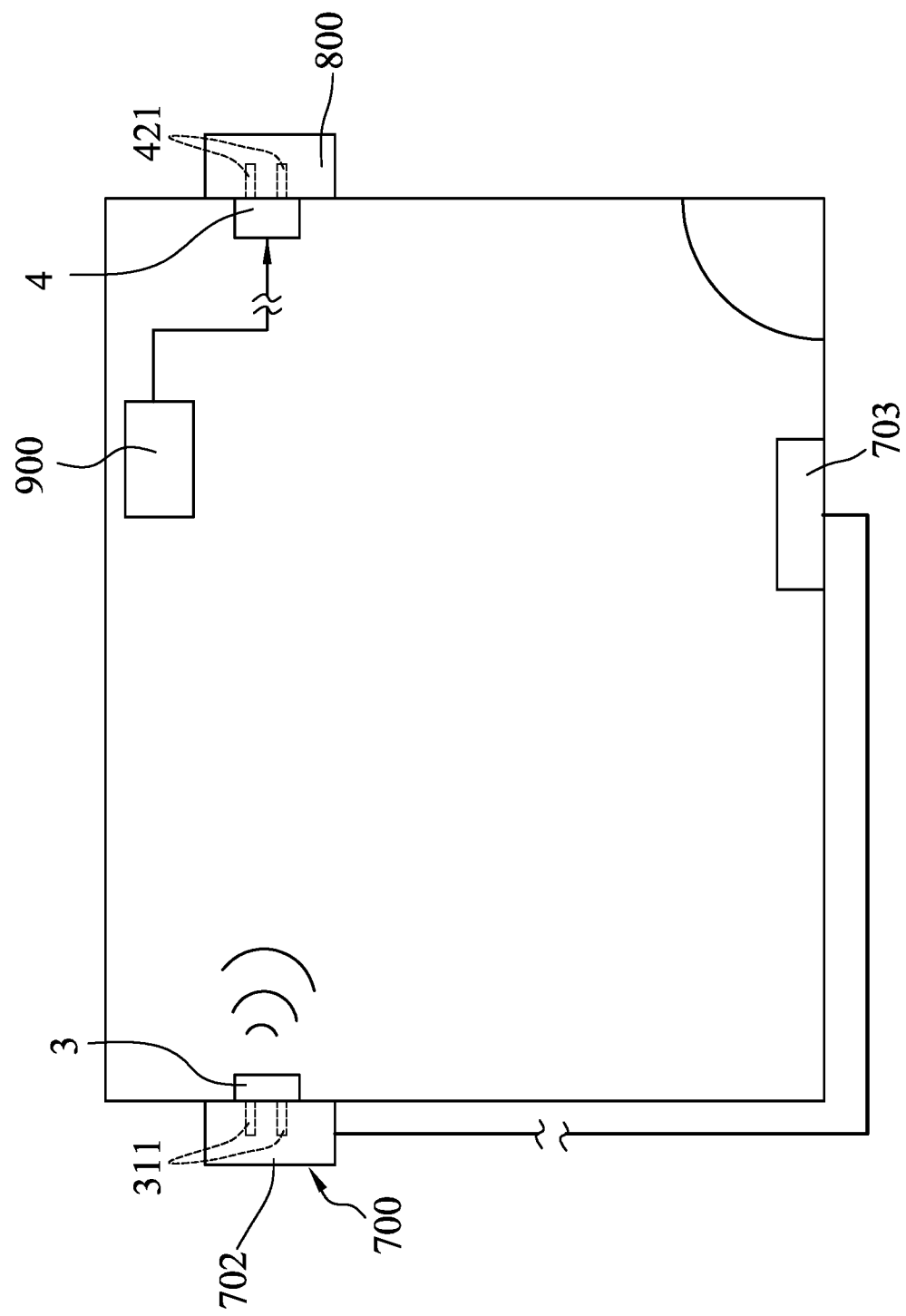
FIG. 3 is a schematic plan view of a room where the power control system is mounted to a switchable socket and a wall socket in the room.

Referring to FIGS. 1 to 3, a power control system according to an embodiment of this disclosure is shown. The power control system includes a remote control module 3 and a socket module 4. The socket module 4 is inserted into a wall socket 800, and the remote control module 3 is inserted into a switchable socket 702. The wall socket 800 constantly provides mains electricity and allows electrically powered equipment to be connected thereto. The switchable socket 702 is electrically connected to a switch 703 which is operable to switch the switchable socket 702 between a conductive state and a non-conductive state. Specifically, the switchable socket 702 is enabled to output mains electricity when in the conductive state, and is disabled from outputting mains electricity when in the non-conductive state.

The remote control module 3 includes a housing 30, an electricity storage circuit 31, two pins 311 and a first wireless communication unit 32. The housing 30 receives the electricity storage circuit 31 and the first wireless communication unit 32. The pins 311 are electrically connected to the electricity storage circuit 31, are at least partly exposed from the housing 30, and are inserted into the switchable socket 702.

The electricity storage circuit 31 is electrically connected to the switchable socket 702 through the pins 311, and is to be charged by mains electricity outputted by the switchable socket 702 through the pins 311 so as to store electricity when the switchable socket 702 is in the conductive state. In particular, the electricity storage circuit 31 is configured to convert the mains electricity from alternating current (AC) to direct current (DC) so as to output electricity in DC.

The first wireless communication unit 32 is powered up by the electricity stored in and outputted by the electricity storage circuit 31 for wirelessly transmitting a power-on signal and a power-off signal to the socket module 4. Specifically, the first wireless communication unit 32 transmits the power-on signal to the socket module 4 when the switchable socket 702 is switched from the non-conductive state to the conductive state, and transmits the power-off signal to the socket module 4 when the switchable socket 702 is switched from the conductive state to the non-conductive state. In some embodiments, the remote control module 3 further includes a detecting circuit (not shown) electrically connected to the switchable socket 702 when the remote control module 3 is inserted into a switchable socket 702. The detecting circuit detects electricity outputted by the switchable socket 702 so as to determine whether the switchable socket 702 is in the conductive state or the non-conductive state, and transmits to the first communication unit 32 a signal that indicates result of determination.

The socket module 4 includes a casing 40, a second wireless communication unit 41, a power control unit 42, two pins 421 and a receptacle 43. The casing 40 receives the second wireless communication unit 41, the power control unit 42 and the receptacle 43.

The second wireless communication unit 41 is configured to wirelessly communicate with the first communication unit 32 to receive the power-on signal and the power-off signal therefrom. For example, the wireless transmission technology between the first communication unit 32 and the second communication unit 41 is ZigBee, Bluetooth, Z-Wave, Wi-Fi or Sub-1 GHz proprietary protocol, and the present disclosure is not limited in the respect.

The pins 421 are electrically connected to the power control unit 42, are at least partly exposed from the casing 40, and are inserted into the wall socket 800 to transmit mains electricity from the wall socket 800 to the power control unit 42. The power control unit 42 is electrically connected to the receptacle 43, and is electrically connected to the wall socket 800 through the pins 421. The receptacle 43 allows an electric device 900 to be electrically connected thereto. In response to receipt of the power-on signal through the second wireless communication unit 41 from the first wireless communication unit 32, the power control unit 42 transmits mains electricity from the wall socket 800 to the receptacle 43, so that the receptacle 43 can provide electricity to the electric device 900 for activating the electric device 900. On the other hand, in response to receipt of the power-off signal through the second wireless communication unit 41 from the first wireless communication unit 32, the power control unit 42 stops transmitting mains electricity from the wall socket 800 to the receptacle 43, so that the receptacle 43 cannot provide electricity. Note that operations of the power control unit 42 and the second wireless communication unit 41 of the socket module 4 are powered by mains electricity from the wall socket 800.

In an example, by simply inserting the pins 311 of the remote control module 3 into the switchable socket 702 and inserting the pins 421 of the socket module 4 into the wall socket 800, the power control system according to one embodiment of this disclosure is mounted in a room as shown in FIG. 3. When the switch 703 is operated so as to switch the switchable socket 702 to the conductive state, mains electricity from the switchable socket 702 is provided to charge the electricity storage circuit 31 and the first wireless communication unit 32 is powered up by the electricity stored in the electricity storage circuit 31 to transmit the power-on signal to the second wireless communication unit 41. Then, the power control unit 42 transmits mains electricity from the wall socket 800 to the receptacle 43 to which the electric device 900 is electrically connected. In this embodiment, the electric device 900 is a lighting fixture that is turned on to emit light upon receipt of mains electricity from the wall socket 800 through the receptacle 43. On the other hand, when the switchable socket 702 is switched to the non-conductive state, the first wireless communication unit 32, which is powered up by the electricity stored in the electricity storage circuit 31, transmits the power-off signal to the second wireless communication unit 41 and the power control unit 42 stops transmitting mains electricity to the receptacle 43, so that the lighting fixture is turned off and does not emit light.

To sum up, when a user intends to control the electric device 900 using the switch 703, the user can insert the remote control module 3 to the switchable socket 702, and insert the socket module 4 to a wall socket 800 that constantly provides mains electricity and that may be located near a position where the user intends to place the electric device 900. By this way, flexibility of placement of the electric device 900 is provided in that the electric device 900 does not have to be limited to being connected to the switchable socket 702 and can be placed at a desired position in the room without using an extension cord, while the user is still granted the ability to simply turn on or off the electric device 900 by operating the switch 703.

It should be noted herein that while the configurations of two-flat-pin plug/socket are adopted in the embodiment depicted in the drawings and described above, a person skilled in the art would appreciate that the configurations of three-pin plug/socket, two-round-pin plug/socket, or any other AC power plug/socket standard used in different parts of the world, or even a multi-standard configuration may be adopted in practice to implement the power control system of this disclosure.

In the description above, for the purposes of explanation, numerous specific details have been set forth in order to provide a thorough understanding of the embodiment. It will be apparent, however, to one skilled in the art, that one or more other embodiments maybe practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A power control system configured to be inserted into a switchable socket and a wall socket, the wall socket constantly providing mains electricity, the switchable socket being electrically connected to a switch that is operable to switch the switchable socket between a conductive state to output mains electricity and a non-conductive state to not output mains electricity, said power control system comprising:

a socket module configured to be inserted into the wall socket to receive mains electricity, allowing an electric device to be electrically connected thereto, and configured to provide mains electricity from the wall socket to the electric device upon wirelessly receiving a power-on signal and to not provide electricity to the electric device upon wirelessly receiving a power-off signal; and a remote control module including an electricity storage circuit that is configured to be electrically connected to the switchable socket, and that is configured to be charged by mains electricity outputted by the switchable socket when the switchable socket is in the conductive state, wherein said remote control module is configured to operate with electricity stored in said electricity storage circuit for wirelessly transmitting the power-on signal to said socket module when the switchable socket is switched from the non-conductive state to the conductive state, and for wirelessly transmitting the power-off signal to said socket module when the switchable socket is switched from the conductive state to the non-conductive state.

2. The power control system as claimed in claim 1, wherein said socket module includes:
   a receptacle allowing the electric device to be electrically connected thereto; and
   a power control unit electrically connected to said receptacle, and configured to be electrically connected to the wall socket, to transmit mains electricity from the wall socket to said receptacle in response to receipt of the power-on signal, and to stop transmitting mains electricity from the wall socket to said receptacle in response to receipt of the power-off signal.

3. The power control system as claimed in claim 2, wherein said remote control module further includes a first wireless communication unit configured to be powered up by the electricity stored in said electricity storage circuit for transmitting the power-on signal when the switchable socket is switched from the non-conductive state to the conductive state, and for transmitting the power-off signal when the switchable socket is switched from the conductive state to the non-conductive state,
wherein said socket module further includes a second wireless communication unit configured to wirelessly communicate with said first communication unit to receive the power-on signal and the power-off signal.

4. The power control system as claimed in claim 3, wherein said remote control module further includes:
   a housing that receives said electricity storage circuit and said first wireless communication unit; and
   two pins that are electrically connected to said electricity storage circuit, that are at least partly exposed from said housing, and that are configured to be inserted into the switchable socket to transmit mains electricity from the switchable socket to said electricity storage circuit.

5. The power control system as claimed in claim 3, wherein said socket module further includes:
   a casing receiving said power control unit, said receptacle and said second wireless communication unit; and
   two pins that are electrically connected to said power control unit, that are at least partly exposed from said casing, and that are configured to be inserted into the wall socket to transmit mains electricity from the wall socket to the power control unit.

* * * * *